United States Patent [19]

Gleim et al.

[11] Patent Number: 4,700,115
[45] Date of Patent: Oct. 13, 1987

[54] METHOD OF STARTING AN ELECTRONICALLY COMMUTATED DIRECT-CURRENT MOTOR

[75] Inventors: Günter Gleim, Marbach; Sandor Gyarmati, Pfaffenweiler, both of Fed. Rep. of Germany

[73] Assignee: Deutsche Thomson-Brandt GmbH, Villinghen-Schwenningen, Fed. Rep. of Germany

[21] Appl. No.: 876,881
[22] PCT Filed: Aug. 5, 1985
[86] PCT No.: PCT/EP85/00394
  § 371 Date: Jun. 13, 1986
  § 102(e) Date: Jun. 13, 1986
[87] PCT Pub. No.: WO86/02212
  PCT Pub. Date: Apr. 10, 1986

[30] Foreign Application Priority Data
  Sep. 26, 1984 [DE] Fed. Rep. of Germany ....... 3435270

[51] Int. Cl.$^4$ ........................................... H02K 29/06
[52] U.S. Cl. .................................. 318/254; 318/138; 318/439
[58] Field of Search .................. 318/138, 254, 439

[56] References Cited

U.S. PATENT DOCUMENTS

| | | | |
|---|---|---|---|
| 3,663,877 | 5/1972 | Clark | 318/254 A |
| 4,481,440 | 11/1984 | Muller | 318/254 X |
| 4,578,606 | 3/1986 | Welterlin | 318/254 X |
| 4,585,979 | 4/1986 | Sakamoto et al. | 318/254 |

FOREIGN PATENT DOCUMENTS 57-43596 3/1982 Japan .................................. 318/254

Primary Examiner—William M. Shoop, Jr.
Assistant Examiner—Bentsu Ro
Attorney, Agent, or Firm—Max Fogiel

[57] ABSTRACT

Process for starting an electronically switched d.c. motor with n coils cyclically activated by pulses which are derived from the rotation of the motor. First, each time motor is switched any selected coil of the motor is supplied with current by means of an evaluation circuit, after which the evaluation produces the first and subsequent pulses derived from rotation of the motor, in the sequence of the nominal rotation direction, irrespective of the momentary position and rotation direction of the motor.

1 Claim, 3 Drawing Figures

METHOD OF STARTING AN ELECTRONICALLY COMMUTATED DIRECT-CURRENT MOTOR

BACKGROUND OF THE INVENTION

The invention concerns a method of starting an electronically commutated direct-current motor with several cyclically activated coils by means of commutating signals emitted while the motor rotates.

There is always a problem involved in detecting and processing the actual direction and phase relation of rotation of motors of this type. Using several sensors to detect the direction and phase relation for example is known. The sensors, however, make the device more expensive. Systems with only one sensor that process the differently coded sensed scanned signals in order to detect direction and phase relation are also known. This solution, however, cannot be employed to correctly process the different codes below a prescribed minimum motor speed, at which point there is a substantial period during motor start-up when phase relation and direction of rotation do not conform to what has been set.

Getting a motor of the aforesaid type into the correct direction of rotation by initially stationing it in a prescribed position is also known. During this positioning period the commutation indexing is disengaged, and the commutation stage will only start the motor up from this prescribed initial state once the positioning phase is over.

It is important for a motor, especially one that drives the head drum in a videorecorder, to start moving in the correct direction as soon as possible, before the magnetic tape is threaded in.

SUMMARY OF THE INVENTION

The object of the invention is to obtain reliable start-up in the correct direction in the briefest possible time with only one sensor. This object is attained by the invention recited in the claim.

The invention will now be described with reference to the drawing.

DESCRIPTION OF THE PREFERRED EMBODIMENT

Figure 1:
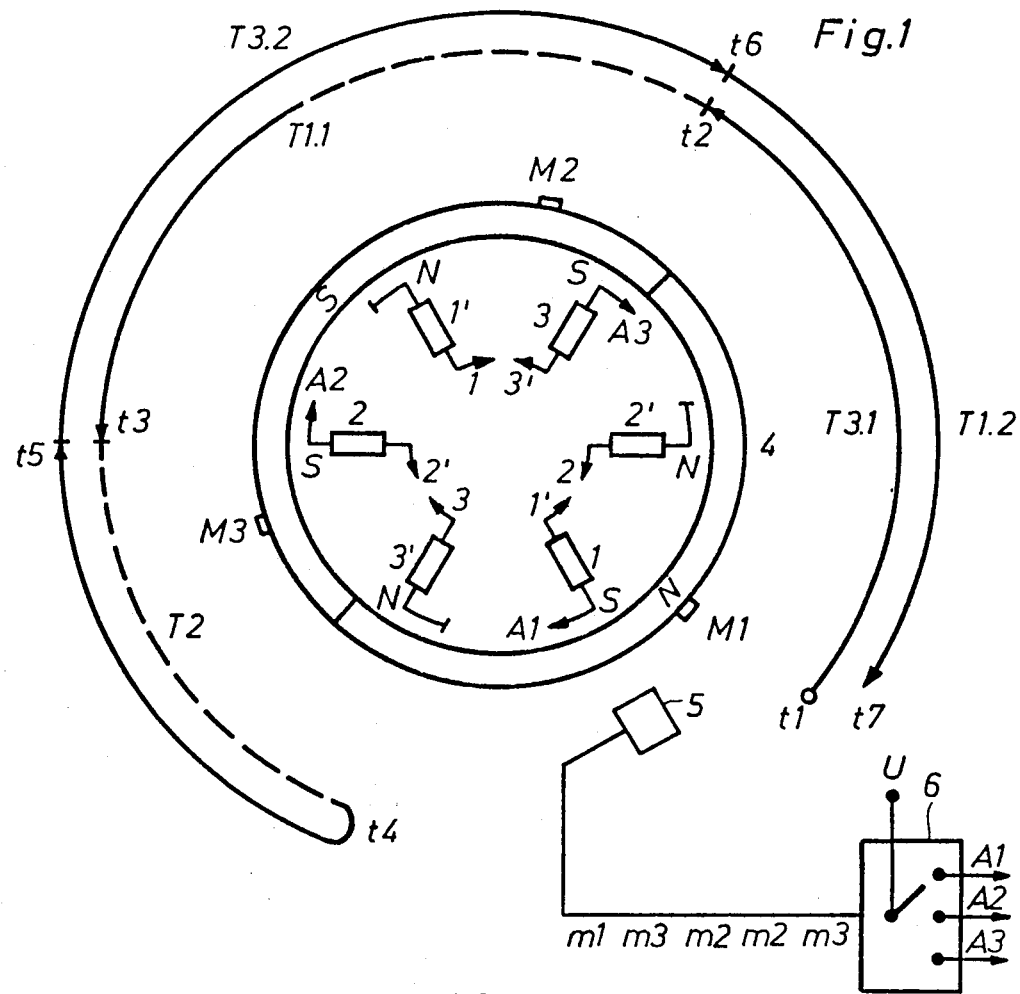
FIG. 1 is a schematic diagram of a motor with a bipolar magnet as a rotor.
Figure 2:
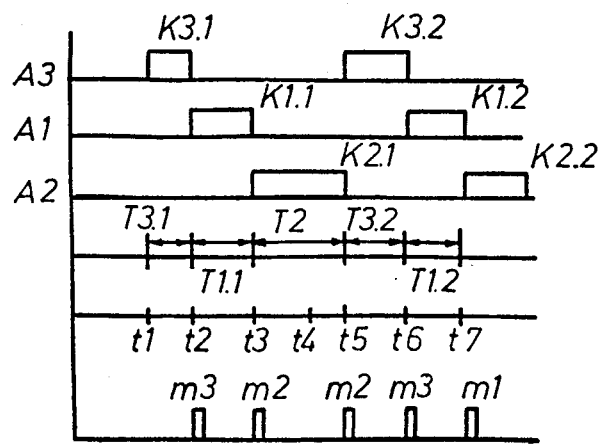
FIG. 2 is a graph illustrating the function of the system in FIG. 1.

The rotor consists of a bipolar magnet 4 with marks M1, M2, and M3, which operate in conjunction with a sensor 5, distributed around its circumference. The pulses m1 to m3 obtained by sensor 5 are supplied to a processing circuit 6 that cyclically switches a voltage U to outputs A1 to A3 every time it encounters a pulse. Outputs A1 to A3 are connected to stator windings 1, 2, and 3. The cyclic activation results in a rotating field for magnet 4.

Assume for the purpose of illustrating how the method works that magnet 4 is in an especially undesirable initial state and activating situation when the motor is started up. At time t1 the motor is placed into operation and it is assumed that output A3 applies voltage U to coil 3 of the stator. Magnet 4 is accordingly initially started up counterclockwise for a period T3.1. At time t2 mark M3 arrives at sensor 5 and generates a commutating pulse K1.1 due to the cyclic indexing of processing circuit 6. Since this supplies stator coil 1 with current, the motor is initially braked as indicated by the counterclockwise broken line. As soon as the north pole of magnet 4 rotates over winding 1' on coil 1, the coil will accelerate it will time t3. Subsequent to period T1.1 mark M2 arrives at sensor 5 and generates a pulse m2, which switches coil 2 on. Since magnet 4 is braked again because coil 2 of the stator attracts it, the magnet reverse direction clockwise at time t4. At time t5 mark M2 arrives at sensor 5 again and generates a pulse m2, which switches on the next coil, coil 3. Since coil 3 now extends along the new direction of rotation, the motor will run in the nominal direction. Subsequent to a period T3.2, coil 1 will be subjected to mark M3 at time t6. This terminates the motor start-up phase and the motor can be cyclically indexed by known commutation methods involving pulses K1 to K3.

Figure 3:
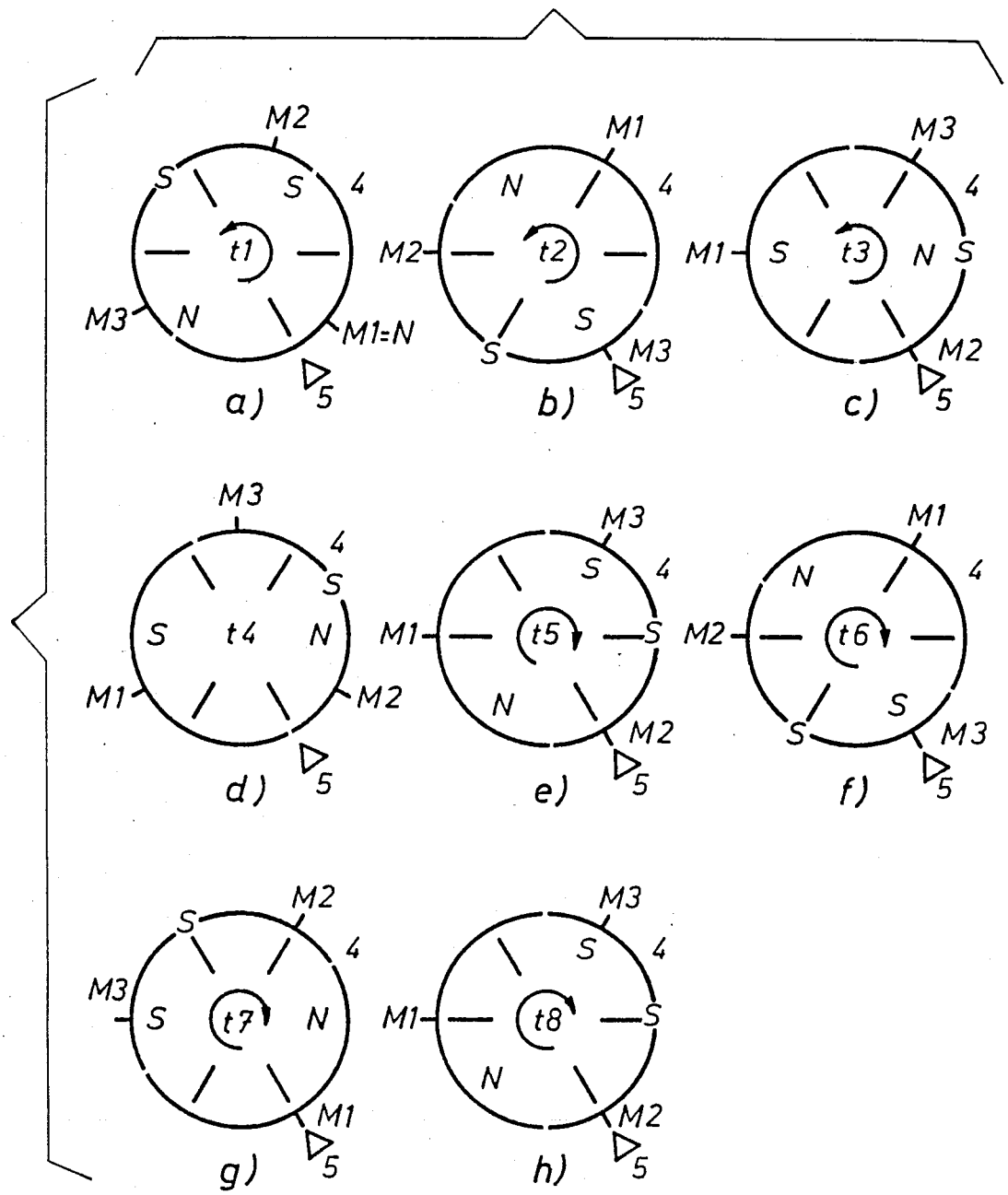
FIG. 3 shows the sequence of motions that occur during the motor's start-up phase.

The sequence of motions involved in the motor start-up phase is illustrated in FIG. 3. The individual phases described with reference to FIG. 1 are represented now by steps a through h. The just activated coil is indicated by the letter N and S. It will be evident that the direction of rotation changes at time t4 and that control in the correct sequence occurs at coils 1, 2, and 3 from the commencement of start-up.

Although the invention has been described with reference to a motor with three coils, employing the method to start a motor with more than three coils is within the scope of the invention.

The commutation marks M can also be coded to distinguish them from marks employed to provide other information.

We claim:

1. A method of starting an electronically commutated direct-current motor with a rotor and with a plurality of cyclically activated coils, comprising the steps of: rotating said rotor with circumference in proximity of a sensor, said rotor having marks applied to said circumference of said rotor; transmitting commutating pulses from said sensor when said marks move past said sensor while rotating said rotor; supplying any one of said coils in the motor with current from a processing circuit whenever the motor is operating; controlling said processing circuit with first and subsequent commutating pulses transmitted from said sensor as the motor rotates so that subsequent commutation steps are generated in a nominal-rotation sequence independent of position of the rotor and independent of direction of rotation of the rotor at any instant.

* * * * *